US012352447B2

(12) United States Patent
Feng et al.

(10) Patent No.: US 12,352,447 B2
(45) Date of Patent: Jul. 8, 2025

(54) EMBEDDED MICROWAVE OVEN

(71) Applicants: GUANGDONG GALANZ ENTERPRISES CO., LTD., Foshan (CN); GUANGDONG GALANZ MICROWAVE ELECTRICAL APPLIANCES, Zhongshan (CN)

(72) Inventors: Liangwang Feng, Zhongshan (CN); Feng Li, Zhongshan (CN)

(73) Assignees: GUANGDONG GALANZ ENTERPRISES CO., LTD., Foshan (CN); GUANGDONG GALANZ MICROWAVE ELECTRICAL APPLIANCES, Zhongshan (CN)

( * ) Notice: Subject to any disclaimer, the term of this patent is extended or adjusted under 35 U.S.C. 154(b) by 919 days.

(21) Appl. No.: 17/608,317

(22) PCT Filed: Nov. 20, 2020

(86) PCT No.: PCT/CN2020/130652
§ 371 (c)(1),
(2) Date: Nov. 2, 2021

(87) PCT Pub. No.: WO2021/115104
PCT Pub. Date: Jun. 17, 2021

(65) Prior Publication Data

US 2022/0221162 A1 Jul. 14, 2022

(30) Foreign Application Priority Data

Dec. 11, 2019 (CN) ........................ 201911269009.1

(51) Int. Cl.
*F24C 15/30* (2006.01)
*H05B 6/64* (2006.01)

(52) U.S. Cl.
CPC ........... *F24C 15/30* (2013.01); *H05B 6/6414* (2013.01); *H05B 6/642* (2013.01); *H05B 6/6426* (2013.01); *H05B 2206/044* (2013.01)

(58) Field of Classification Search
CPC . F24C 15/30; H05B 2206/044; H05B 6/6414; H05B 6/642; H05B 6/6426; H05B 6/80
(Continued)

(56) References Cited

U.S. PATENT DOCUMENTS

2006/0191925 A1 8/2006 Iwamoto

FOREIGN PATENT DOCUMENTS

CN 101225974 A 7/2008
CN 103615751 A 3/2014
(Continued)

OTHER PUBLICATIONS

Lubbe, DE 19705696 C1 (Year: 1998).*
(Continued)

*Primary Examiner* — Vy T Nguyen
(74) *Attorney, Agent, or Firm* — Taft Stettinius & Hollister LLP

(57) ABSTRACT

An embedded microwave oven, comprising a box body (10), a door body (20), a front plate (30), a first partition plate (40), and a heat dissipation fan. Under the action of the heat dissipation fan, external air enters an air inlet mesh from a front air inlet (14) and enters a spacing region between a wall of a housing (11) and a wall of a cooking cavity (12), and after electronic components are air-cooled, hot air is discharged outwards from a front air outlet hole (31) and a front air outlet (13). The first partition plate (40) can avoid mixing of cold air entering from the front air inlet (14) and hot air discharged from the front air outlet (13), and can prevent the hot air, which is discharged from the front air
(Continued)

outlet (13), from directly entering the front air inlet (14) and then entering the box body (10).

16 Claims, 9 Drawing Sheets

(58) Field of Classification Search
USPC ....... 219/757, 401, 756, 400, 680, 681, 689, 219/730, 760; 126/21 A, 299 R, 299 D, 126/1 R, 20, 211, 214 B, 215, 299 E, 126/39 R, 50; 99/283, 306, 325, 357, 99/448, DIG. 14
See application file for complete search history.

(56) References Cited

FOREIGN PATENT DOCUMENTS

| | | | |
|---|---|---|---|
| CN | 203615385 | U | 5/2014 |
| CN | 207118012 | U | 3/2018 |
| CN | 208124396 | U | 11/2018 |
| CN | 109041315 | A | 12/2018 |
| CN | 110179324 | A | 8/2019 |
| CN | 110274266 | A | 9/2019 |
| CN | 209545926 | U | 10/2019 |
| CN | 110848764 | A | 2/2020 |
| CN | 211822534 | U | 10/2020 |
| JP | 2006223337 | A | 8/2006 |
| WO | 2017015780 | A1 | 2/2017 |

OTHER PUBLICATIONS

Kim,KR 20020050025 A (Year: 2002).*
Kim, KR 20060119176 A (Year: 2006).*
International Search Report for Application No. PCT/CN2020/130652 dated Feb. 5, 2021, 5 pages.
Written Opinion for Application No. PCT/CN2020/130652 dated Feb. 5, 2021, 5 pages.
Chinese Patent Office, First Office Action issued in corresponding Application No. 201911269009.1, dated Apr. 18, 2024, 20 pp.

* cited by examiner

EMBEDDED MICROWAVE OVEN

CROSS REFERENCE TO RELATED APPLICATIONS

This is a U.S. National Stage application of, and claims priority to, PCT/CN2020/130652, filed Nov. 20, 2020, which further claims priority to Chinese Patent Application No. 201911269009.1, filed Dec. 11, 2019, the disclosures of which are incorporated herein by reference in their entirety.

TECHNICAL FIELD

The present disclosure relates to a microwave oven, specially to an embedded microwave oven.

BACKGROUND

The heat generated by the microwave oven itself mainly comes from the magnetron and the power supply. It is necessary to pay attention to the heat dissipation of these two components, otherwise the performance of the microwave oven will be affected and the service life of the microwave oven will easily be reduced. Microwave ovens are divided into countertop microwave ovens and embedded microwave ovens. Among them, the installation method of the embedded microwave oven is to be built in the cabinet, which will not occupy space on the countertop. Since the inside of the cabinet is not in communication with the outside world like the countertop, only the front opening of the cabinet is connected to the outside world, or a hole is opened inside the cabinet in communication with the outside world, which brings new challenges to the heat dissipation of the embedded microwave oven.

SUMMARY

Accordingly, it is necessary to overcome the shortcomings of the prior art and to provide an embedded microwave oven, which can improve the heat dissipation effect.

The technical solution is as follows: an embedded microwave oven includes: a cooker body and a door, wherein the cooker body includes a first outer housing and a cooking cavity provided in the first outer housing, both the first outer housing and the cooker body are provided with an opening corresponding to the door, the door is openably covered the opening, the first outer housing includes a bottom cover plate, a first side cover plate and a rear cover plate, the first side cover plate and the rear cover plate are all connected to the bottom cover plate, and at least one of the bottom cover plate, the first side cover plate and the rear cover plate is provided with an air inlet mesh; a front plate arranged in periphery of the opening of the cooking cavity, wherein a bottom of the front plate is provided with a front air exit hole penetrating the front plate, a spacing region is formed between a housing wall of the first outer housing and a cavity wall of the cooking cavity, the front air exit hole is in communication with the spacing region, and when the door is closed, the door is attached to the front plate to seal the opening; a first spacing plate connected to a bottom edge of the front plate or to a side edge of the bottom cover plate close to the opening, wherein the first spacing plate is located below the door and a front air outlet is formed between the first spacing plate and a bottom end of the door, a supporting leg protruding downward is provided on a bottom surface of the bottom cover plate, and a supporting surface where the first spacing plate and the supporting leg are placed is provided with a front air inlet; and a radiator fan arranged in a spacing region between the housing wall of the first outer housing and the cavity wall of the cooking cavity.

When the aforementioned embedded microwave oven is working, under the action of the radiator fan, the outside air enters the air inlet mesh from the front air inlet and enters the spacing region between the housing wall of the first outer housing and the cavity wall of the cooking cavity. After the electronic components (such as a variable frequency power supply and a magnetron) are air-cooled, the hot air is discharged from the front air exit holes and the front air outlet. The first spacing plate can prevent the cold air from the front air inlet and the hot air from the front air outlet from mixing with each other, and prevent the hot air from the front air outlet from directly entering the front air inlet and then entering the cooker body, which plays a better role of buffering, that is, the hot air is discharged from the front air outlet and dissipates heat to the outside air, and then enters the cooker body through the front air inlet; in addition, the hot air discharged from the front air outlet can be reflected towards a front upper side of the cooker body through the first spacing plate, so it is not easy to be sucked in by the front air inlet.

In an embodiment, a bottom part of the door facing a plate surface of the front plate is provided with a bottom edge notch, and the bottom edge notch and the front air exit hole are arranged oppositely.

In an embodiment, two side parts of the door facing the plate surface of the front plate are both provided with a side edge notch, and two side edge notches are in communication with both ends of the bottom edge notch, respectively.

In an embodiment, the first outer housing further includes a top cover plate arranged on the top of the cooking cavity, the top cover plate is connected to the first side cover plate and the rear cover plate, respectively; a top wall of the cooking cavity is provided with a hot air assembly, the top cover plate covers the hot air assembly, and at least a part of the air discharged by the radiator fan flows through the hot air assembly.

In an embodiment, the embedded microwave oven further includes a variable frequency power supply and a magnetron, the top wall of the cooking cavity is provided with a lateral surrounding edge on a side away from the door, the lateral surrounding edge is attached to the top cover plate, and the radiator fan, the variable frequency power supply and the magnetron are all arranged in a spacing region between a rear wall of the cooking cavity and the rear cover plate.

In an embodiment, the radiator fan includes a first fan for heat dissipation of the variable frequency power supply and a second fan for heat dissipation of the magnetron; the lateral surrounding edge comprises a main body surrounding edge and an arc-shaped surrounding edge connected to one end of the main body surrounding edge, the arc-shaped surrounding edge is used to guide the air to a spacing region between a side wall of the cooking cavity and the first side cover plate; the top wall of the cooking cavity is also provided with a guiding edge, a ventilation gap is provided between the guiding edge and the other end of the main body surrounding edge, and the guiding edge extends to a middle part of the cooking cavity.

In an embodiment, the air inlet mesh includes a side air inlet mesh and a bottom air inlet mesh; the first side cover plate is provided with the side air inlet mesh on one of corner parts thereof close to the rear cover plate and the bottom cover plate, the bottom cover plate is provided with the bottom air inlet mesh on one of corner parts thereof close to the first side cover plate and the rear cover plate;

a plane where an air inlet of the first fan is located is arranged obliquely with respect to the bottom cover plate and to face the side air inlet mesh and the bottom air inlet mesh, a plane where an air outlet of the first fan is located is arranged to face the variable frequency power supply, a plane where an air inlet of the second fan is located faces the bottom air inlet mesh or the side air inlet mesh, and a plane where an air outlet of the second fan is located is arranged to face the magnetron.

In an embodiment, the rear cover plate is provided with a first rear air inlet mesh at one of corner parts thereof close to the first side cover plate and the bottom cover plate.

In an embodiment, the first fan is arranged above the second fan, an included angle between a first central axis of the first fan and a second central axis of the second fan is A, and A is less than 90°.

In an embodiment, the second fan is a turbo fan, an upper surface and a lower surface of the turbo fan are both provided with an air inlet, the lower surface of the turbo fan is connected to a first air guide cover, a top plate of the first air guide cover is provided with a first vent in communication with the air inlet of the lower surface of the turbo fan, a motor of the turbo fan is arranged in the first air guide cover which covers one part of a region of the bottom air inlet mesh, and a projection of the first fan on the bottom cover plate along a vertical direction is located on the other part of the region of the bottom air inlet mesh.

In an embodiment, a ventilation gap is provided between the first fan and the second fan.

In an embodiment, an second outer housing of the variable frequency power supply is provided with a first lateral ventilation channel, the air outlet of the first fan is in communication with one end of the first lateral ventilation channel, an outer wall of the other end of the first lateral ventilation channel is connected to a vertical spacing plate and a lateral spacing plate, the vertical spacing plate and the lateral spacing plate are arranged in periphery of the magnetron, a second vent is provided on the vertical spacing plate, and the air outlet of the second fan is in communication with the second vent.

In an embodiment, a power connector of the magnetron is arranged close to the lateral spacing plate; the lateral spacing plate is provided with a third vent corresponding to the power connector of the magnetron, and the third vent is located on a side of the lateral spacing plate close to the vertical spacing plate.

In an embodiment, the embedded microwave oven further includes a second air guide cover, a radiator shell of the magnetron is provided with a second lateral ventilation channel, the rear wall of the cooking cavity is provided with a second rear air inlet mesh, the second air guide cover covers the second rear air inlet mesh, the second vent, the second lateral ventilation channel, and an air inlet of the second air guide cover are in communication in sequence.

In an embodiment, the air inlet of the second air guide cover is provided with a heat conducting edge, and the heat conducting edge is attached to the magnetron.

In an embodiment, the embedded microwave oven further includes a container for placing cooking objects connected to the door, and the door is connected to the side wall of the cooking cavity via a slide rail.

DESCRIPTION OF REFERENCE SIGNS

Figure 1:
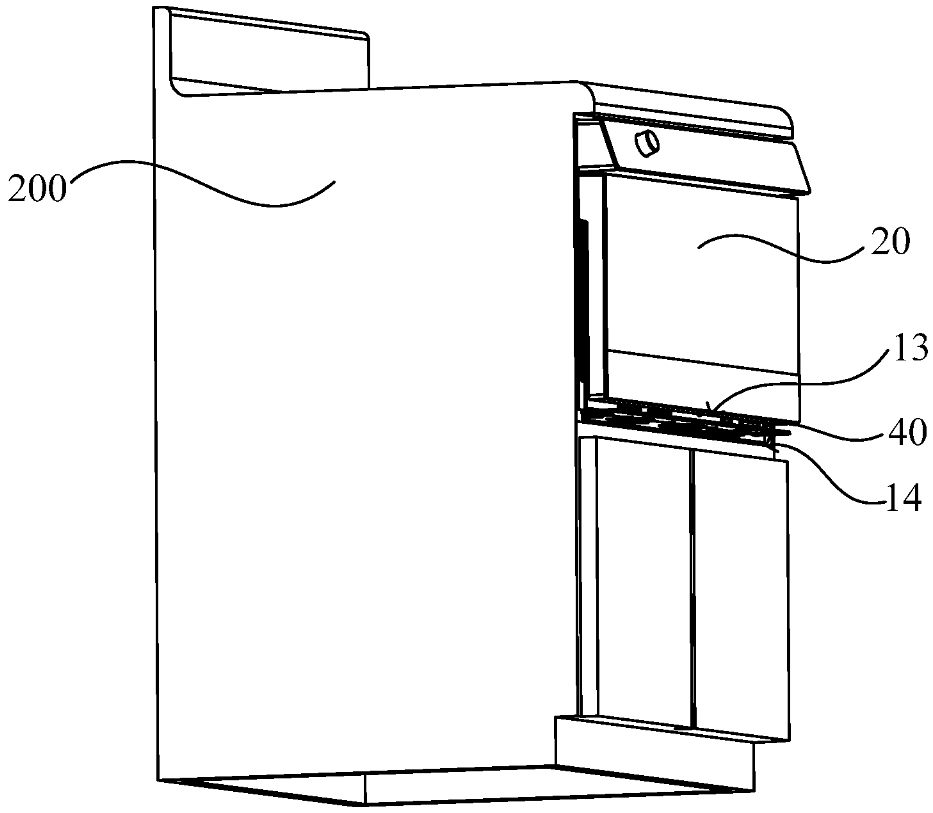
FIG. 1 is a schematic view of a state in which an embedded microwave oven is placed inside a cabinet according to an embodiment of the present disclosure.
Figure 2:
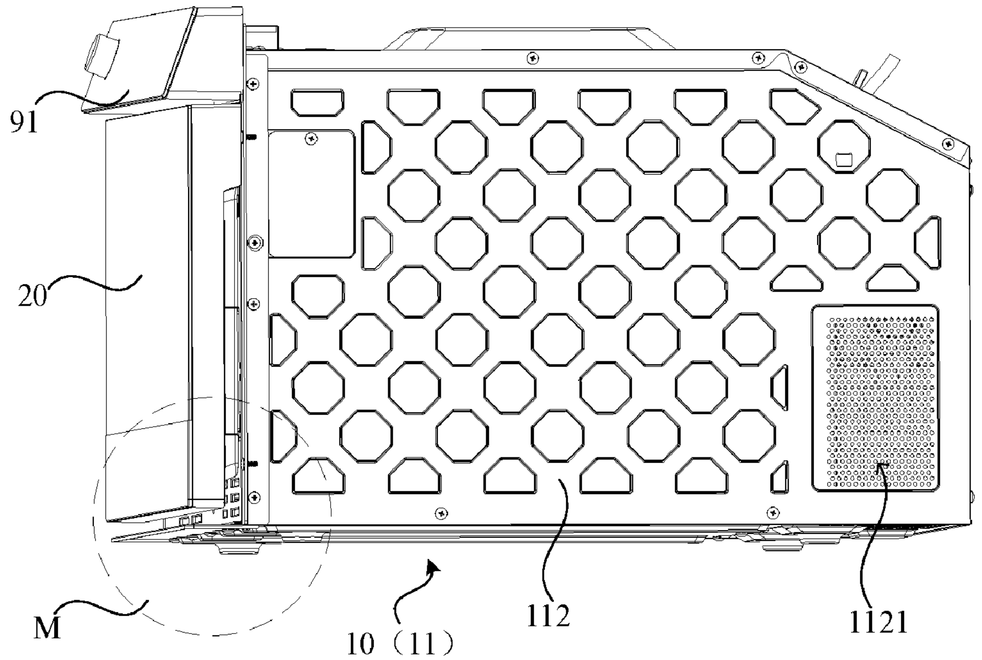
FIG. 2 is a perspective view of the embedded microwave oven according to an embodiment of the present disclosure.
Figure 3:
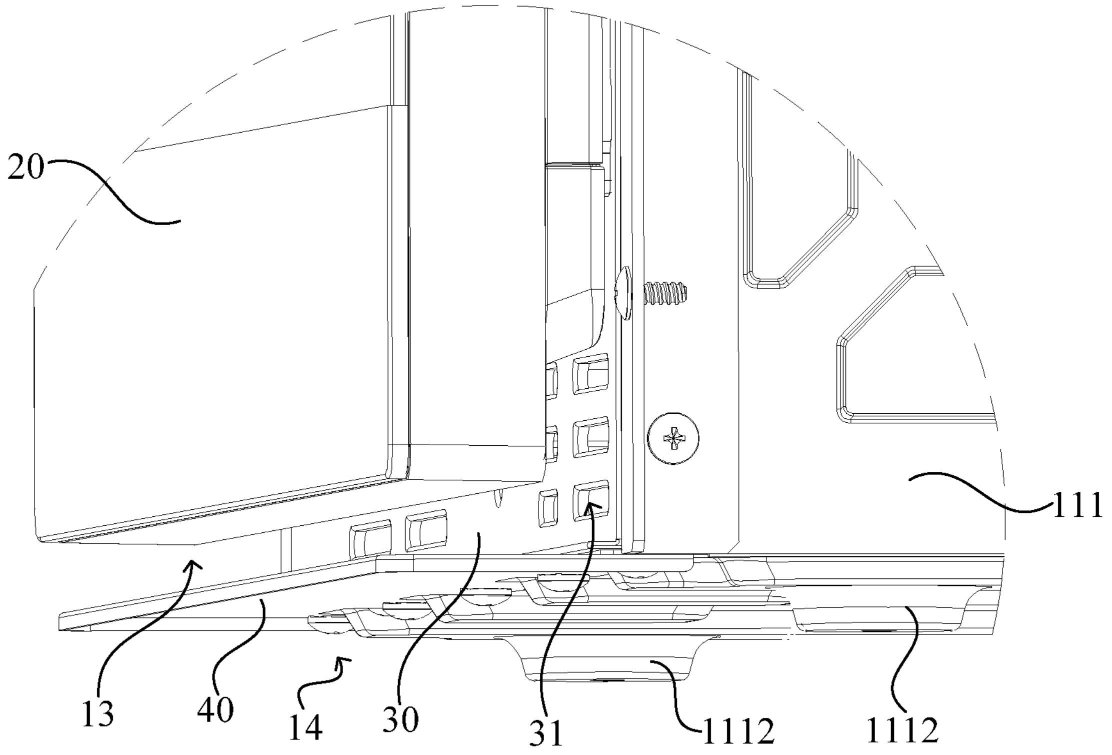
FIG. 3 is an enlarged schematic view of FIG. 2 at location M.
Figure 4:
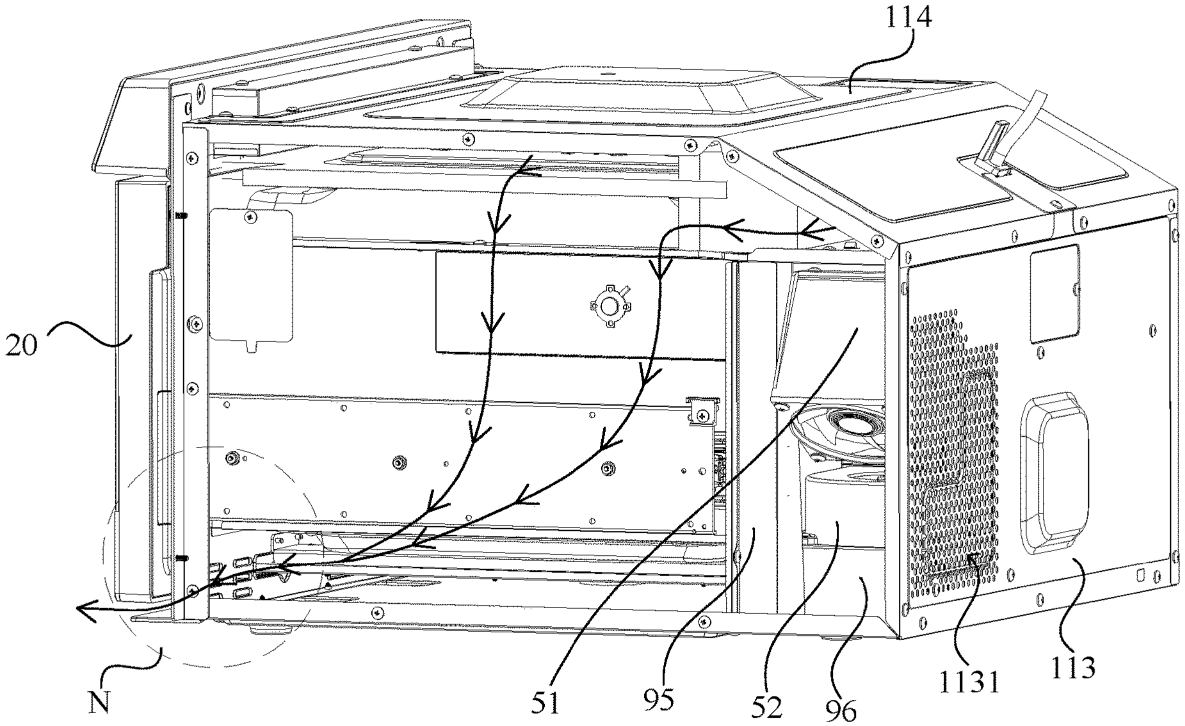
FIG. 4 is a schematic structural view of the embedded microwave oven in a perspective according to an embodiment of the present disclosure, with a first side cover plate removed.
Figure 5:
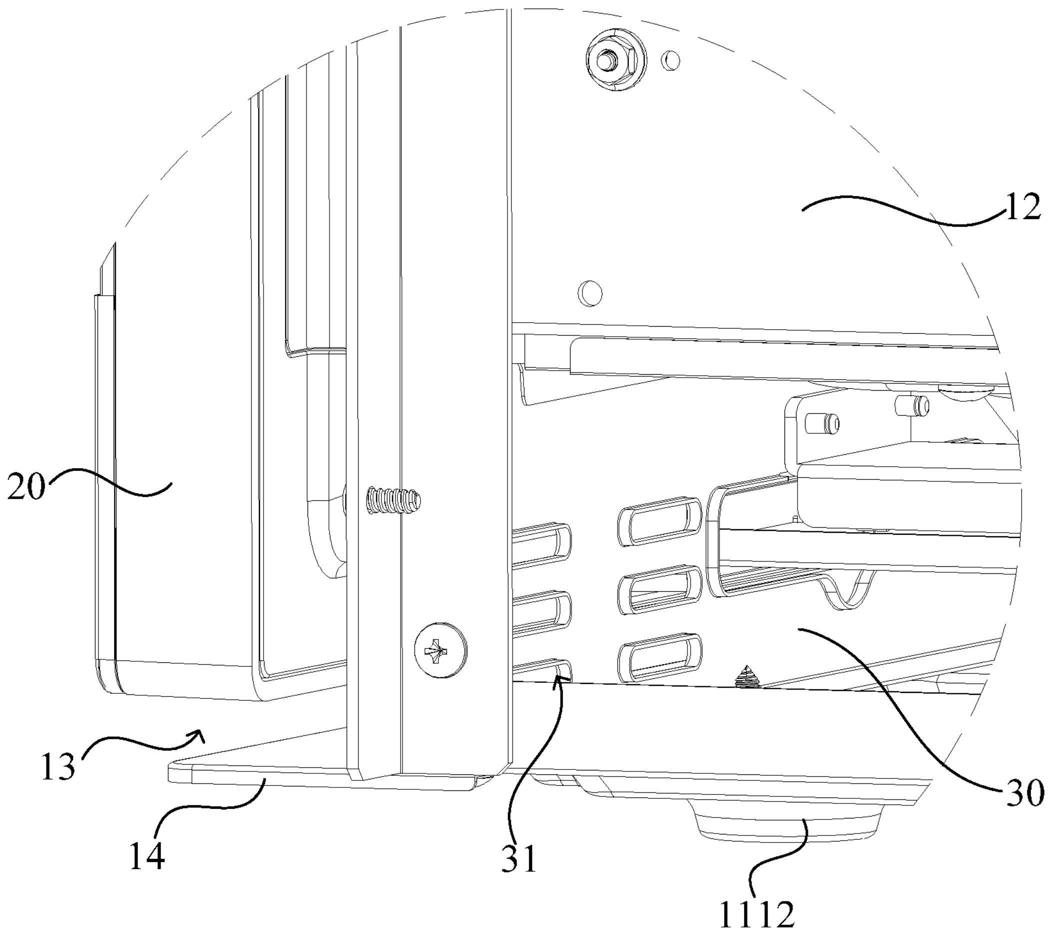
FIG. 5 is an enlarged schematic view of FIG. 4 at location N.
Figure 6:
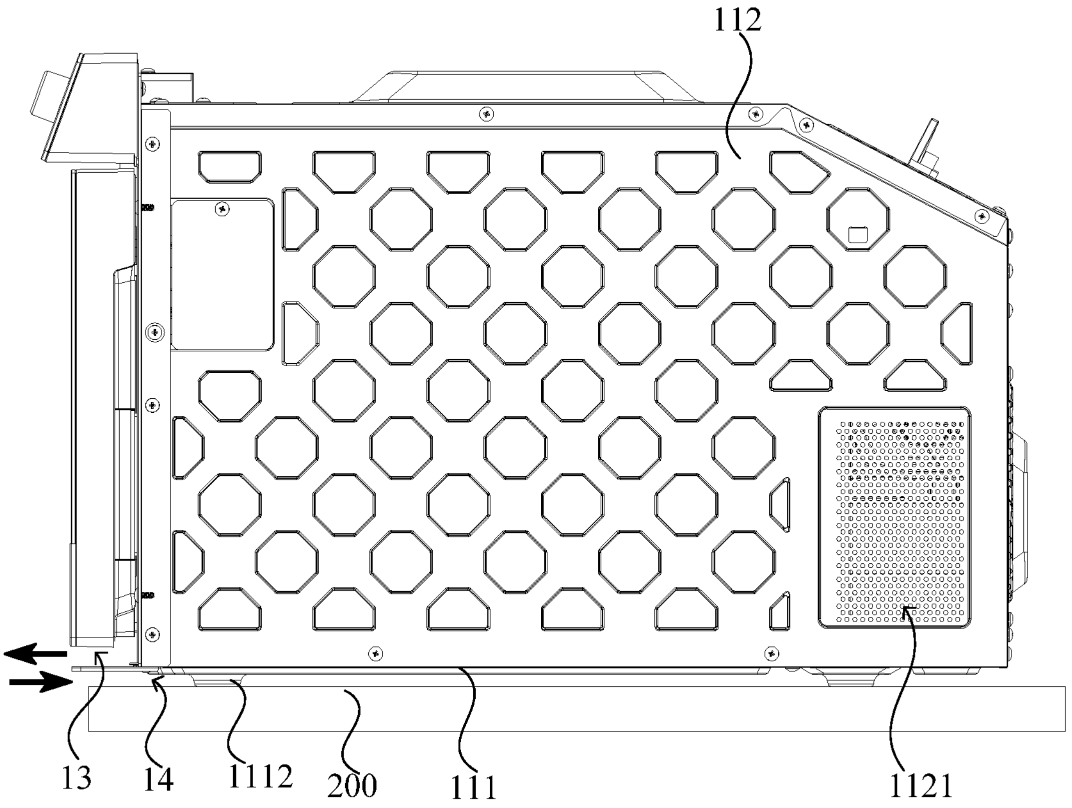
FIG. 6 is a schematic structural view of the embedded microwave oven in a side perspective according to an embodiment of the present disclosure.

10—cooker body; 11—first outer housing; 111—bottom cover plate; 1111—bottom air inlet mesh; 1112—supporting leg; 112—first side cover plate; 1121—side air inlet mesh; 113—rear cover plate; 1131—first rear air inlet mesh; 114—top cover plate; 115—second side cover plate; 12—cooking cavity; 121—second rear air inlet mesh; 13—front air outlet; 14—front air inlet; 20—door; 21—bottom edge notch; 211—inclined wall; 22—side edge notch; 30—front plate; 31—front air exit hole; 40—first spacing plate; 51—first fan; 511—first central axis; 52—second fan; 521—second central axis; 522—fan motor; 53—ventilation gap; 60—variable frequency power supply; 61—second outer housing; 70—magnetron; 71—power connector; 72—radiator shell; 80—hot air assembly; 81—heating tube; 82—heat stirring fan; 83—hot air motor; 91—control box; 92—lateral surrounding edge; 921—main body surrounding edge; 922—arc-shaped surrounding edge; 93—guide edge; 94—ventilation gap; 95—barrier; 96—first air guide cover; 961—baffle; 962—mounting plate; 97—vertical spacing plate; 971—second vent; 98—lateral spacing plate; 981—third vent; 99—second air guide cover; 991—heat conducting edge; 200—cabinet; 210—supporting surface.

DETAILED DESCRIPTION

In order to make the aforementioned objectives, features and advantages of the present disclosure more obvious and understandable, the specific embodiments of the present disclosure will be described in detail below with reference to the accompanying drawings. In the following description, many specific details are explained in order to fully understand the present disclosure. However, the present disclosure can be implemented in many other ways different from those described herein, and those skilled in the art can make similar improvements without departing from the connotation of the present disclosure. Therefore, the present disclosure is not limited by the specific embodiments disclosed below.

In the description of the present disclosure, it should be understood that the terms "first" and "second" are only used for description purposes, and cannot be understood as indicating or implying relative importance or implicitly indicating the number of the indicated technical features. Therefore, the features defined with "first" and "second" may explicitly or implicitly include at least one of the features. In the description of the present disclosure, "plurality" means at least two, such as two, three, etc., unless otherwise specifically defined.

In the description of the present disclosure, it can be understood that, when an element is considered to be "connected" to another element, it can be directly connected to another element or indirectly connected to another element with a mediating element. In contrast, when an element is described to be "directly" connected to another element, there are no intermediate components.

In an embodiment, please refer to FIGS. 1 to 7. An embedded microwave oven includes a cooker body 10, a door 20, a front plate 30, a first spacing plate 40 and a radiator fan. The cooker body 10 includes a first outer housing 11 and a cooking cavity 12 arranged in the first outer housing 11. Both the first outer housing 11 and the cooking cavity 12 are provided with an opening corresponding to the door 20, the door 20 is openably covered the opening, and the first outer housing 11 includes a bottom cover plate 111, a first side cover plate 112 and a rear cover plate 113. The first side cover plate 112 and the rear cover plate 113 are all connected to the bottom cover plate 111, and at least one of the bottom cover plate 111, the first side cover plate 112 and the rear cover plate 113 is provided with an air inlet mesh.

The front plate 30 is arranged in periphery of the opening of the cooking cavity 12, and a bottom of the front plate 30 is provided with a front air exit hole 31 penetrating the front plate 30. A spacing region is formed between a housing wall of the first outer housing 11 and a cavity wall of the cooking cavity 12, the front air exit hole 31 are in communication with the spacing region, and when the door 20 is closed, the door 20 is attached to the front plate 30 to seal the opening. Specifically, a spacing region formed between the first side cover plate 112 and the cavity wall of the cooking cavity 12 is in communication with the front air exit hole 31.

The first spacing plate 40 is connected to a bottom edge of the front plate 30 or to a side edge of the bottom cover plate 111 close to the opening. The first spacing plate 40 is located below the door 20 and a front air outlet 13 is formed between the first spacing plate 40 and a bottom end of the door 20. A supporting leg 1112 protruding downward is provided on a bottom surface of the bottom cover plate 111, and a supporting surface 210 (i.e. the bottom wall of the cabinet 200) on which the first spacing plate 40 and the supporting leg 1112 are placed is provided with a front air inlet 14. The radiator fan is arranged in a spacing region between the housing wall of the first outer housing 11 and the cavity wall of the cooking cavity 12.

When the aforementioned embedded microwave oven is working, under the action of the radiator fan, the outside air enters the air inlet mesh from the front air inlet 14 and enters the spacing region between the housing wall of the first outer housing 11 and the cavity wall of the cooking cavity 12. After the electronic components (such as a variable frequency power supply 60 and a magnetron 70) are air-cooled, the hot air is discharged from the front air exit hole 31 and the front air outlet 13. The first spacing plate 40 can prevent the cold air from the front air inlet 14 and the hot air from the front air outlet 13 from mixing with each other, and prevent the hot air from the front air outlet 13 from directly entering the front air inlet 14 and then entering the cooker body 10, which plays a better role of buffering, that is, the hot air is discharged from the front air outlet 13 and dissipates heat to the outside air, and then enters the cooker body 10 through the front air inlet 14; in addition, the hot air discharged from the front air outlet 13 can be reflected towards a front upper side of the cooker body 10 through the first spacing plate 40, so it is not easy to be sucked in by the front air inlet 14.

Further, referring to FIGS. 4 to 7, a bottom part of the door 20 facing a plate surface of the front plate 30 is provided with a bottom edge notch 21, and the bottom edge notch 21 and the front air exit hole 31 are arranged oppositely. In this way, the hot air discharged from the front air exit hole 31 can be buffered at the bottom edge notch 21, and then discharged into the outside air of the cooker body 10, that is, the area of the air outlet at a most terminal can be increased, and the air outlet speed can be increased. Specifically, in order to achieve a better buffering and diversion effect of the bottom edge notch 21, the notch wall of the bottom edge notch 21 is an oblique wall 211 arranged obliquely with respect to the air outlet direction of the front air exit hole 31.

Specifically, there may be multiple front air exit holes 31 and they are located at the bottom part of the front plate 30.

Further, referring to FIGS. 4 to 7, two side parts of the door 20 facing the plate surface of the front plate 30 are both provided with a side edge notch 22, and two side edge notches 22 are in communication with both ends of the bottom edge notch 21, respectively. In this way, the hot air discharged from the front air exit holes 31 can be buffered at the bottom edge notch 21, and further can be buffered at the side edge notch 22, and then discharged to the outside air of the cooker body 10, which can increase the area of the air outlet at a most terminal and increases the air outlet speed. In addition, a spacing is provided between the bottom wall of the side edge notch 22 and the front plate 30, which is not only used to form a buffer channel for hot air, but also can be used as a handle for opening the door of the embedded microwave oven.

Further, referring to FIGS. 4 to 7, the first outer housing 11 further includes a top cover plate 114 disposed on the top of the cooking cavity 12, the top cover plate 114 is connected to the first side cover plate 112 and the rear cover plate 113. A hot air assembly 80 is provided on a top wall of the cooking cavity 12, the top cover plate 114 covers the hot air assembly 80, and at least a part of the air discharged by the radiator fan flows through the hot air assembly 80. In this way, the cold air outside the cooker body 10 sucked by the radiator fan flows through some electronic components (the variable frequency power supply 60 and the magnetron 70), then flows through the hot air assembly 80 at the top of the cooking cavity 12, then flows into the spacing region between a side wall of the cooking cavity 12 and the first side cover plate 112, and finally is discharged into the external environment of the cooker body 10 through the front air exit holes 31 and the front air outlet 13 of the front plate 30. In this way, the cold air entering the cooker body 10 not only dissipates heat for the variable frequency power supply 60 and the magnetron 70, but also dissipates heat for the hot air motor 83, which can prevent heat from accumulating on the top of the cooker body 10 and affecting a control box 91 besides the hot air assembly 80. Specifically, the control box 91 is arranged on a side of the top cover plate 114 close to the door 20 to facilitate the operation of the control box 91. Of course, the control box 91 can also be arranged at other positions on the top cover plate 114.

Figure 7:
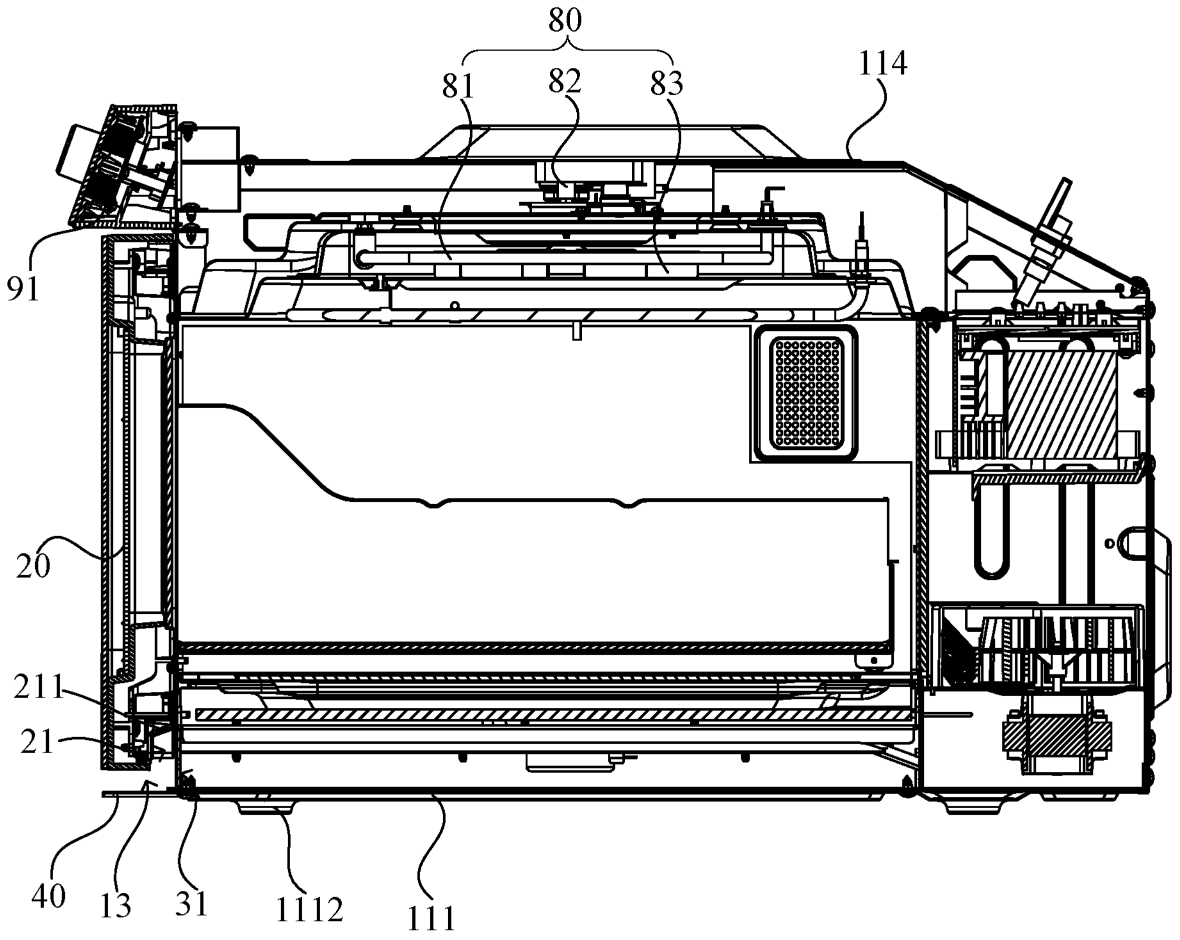
FIG. 7 is a schematic view of the internal structure of the embedded microwave oven according to an embodiment of the present disclosure.
Figure 8:
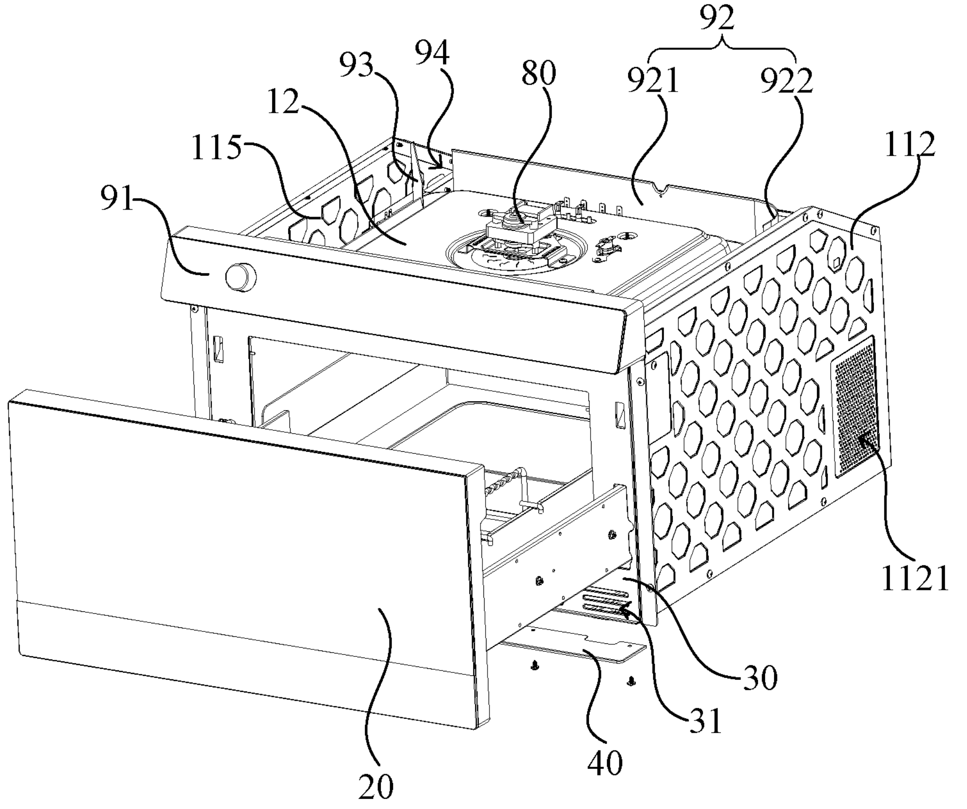
FIG. 8 is a schematic structural view of the embedded microwave oven in a perspective according to an embodiment of the present disclosure, with a first outer housing removed.
Figure 9:
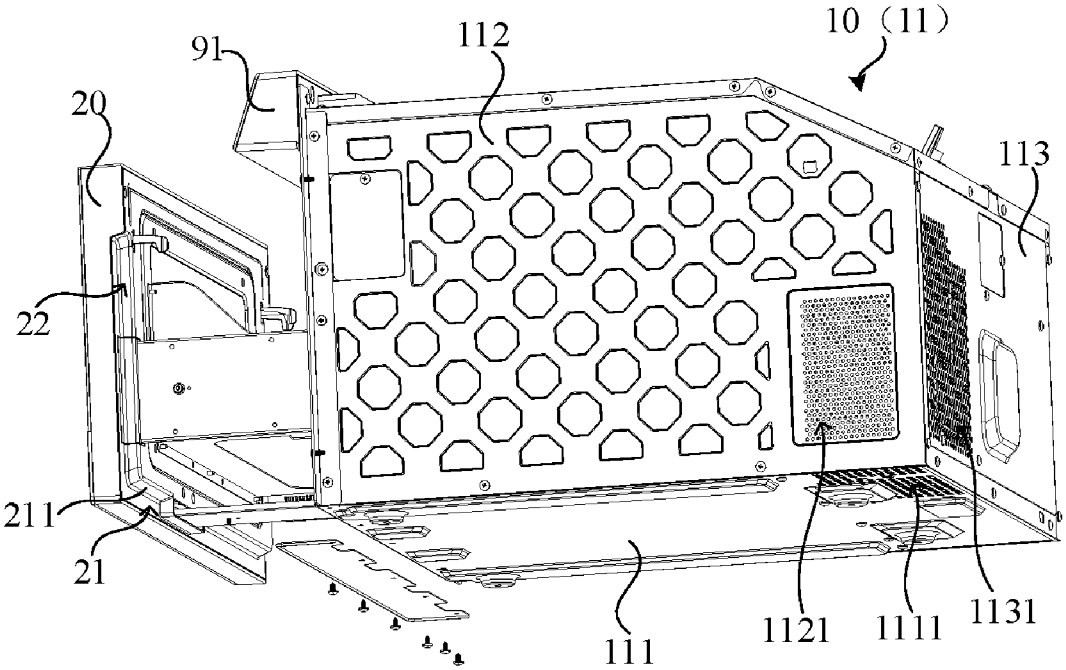
FIG. 9 is a schematic structural view of the embedded microwave oven in another perspective according to an embodiment of the present disclosure, with an first outer housing removed.

It should be noted that, referring to FIGS. 7 and 8, the hot air assembly 80 includes a heating tube 81, a heat stirring fan 82 with metal fan blades, and a hot air motor 83 that drives the heat stirring fan 82.

Figure 10:
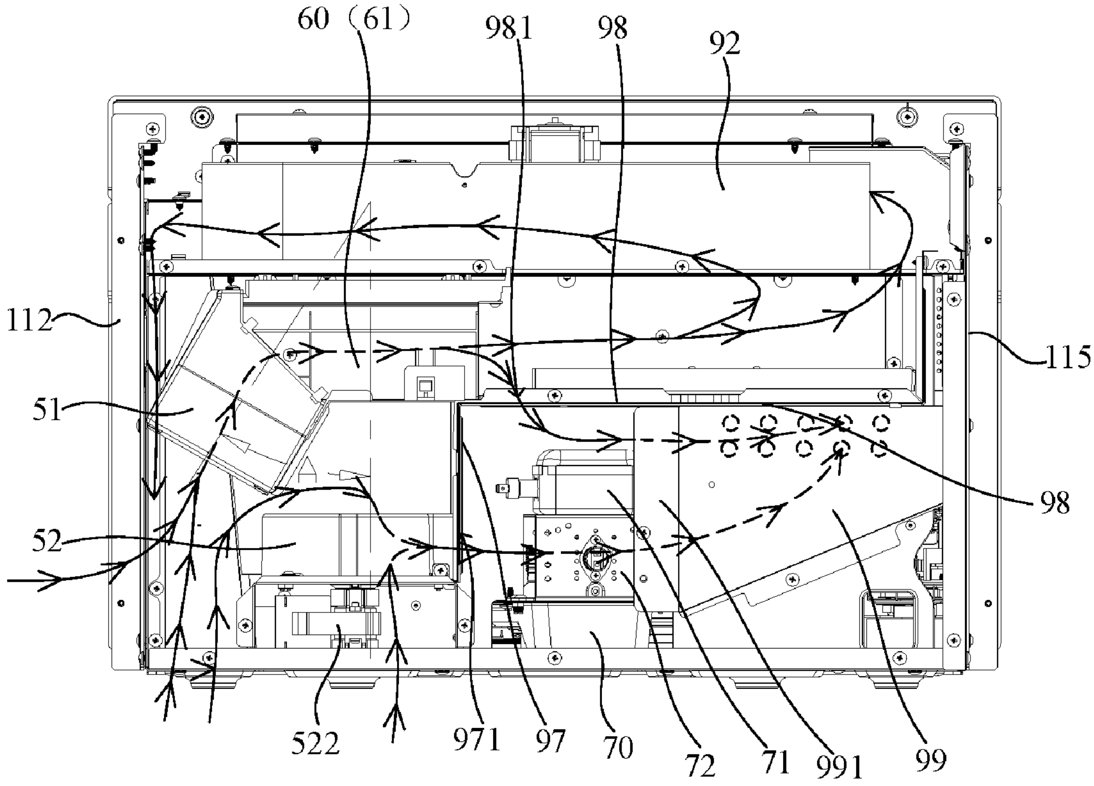
FIG. 10 is a schematic structural view of the embedded microwave oven according to an embodiment of the present disclosure, with a rear cover plate removed.
Figure 11:
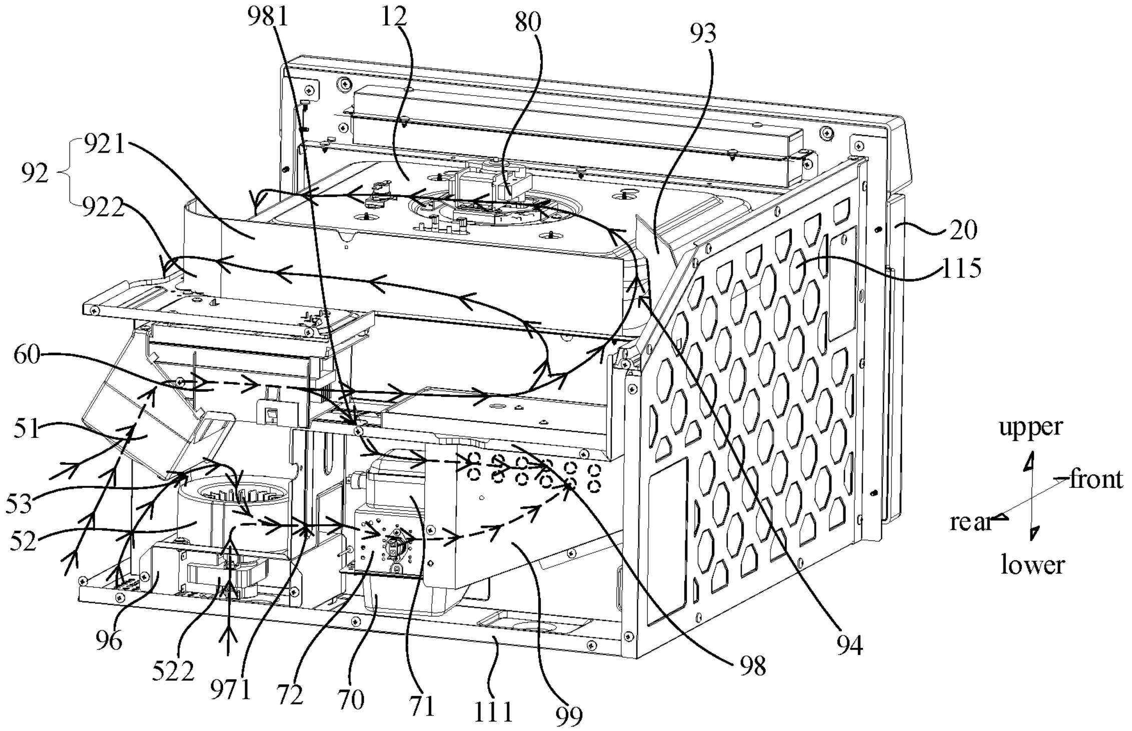
FIG. 11 is a schematic structural view of the embedded microwave oven in a perspective according to an embodiment of the present disclosure, with a rear cover plate and a first side cover plate removed.
Figure 12:
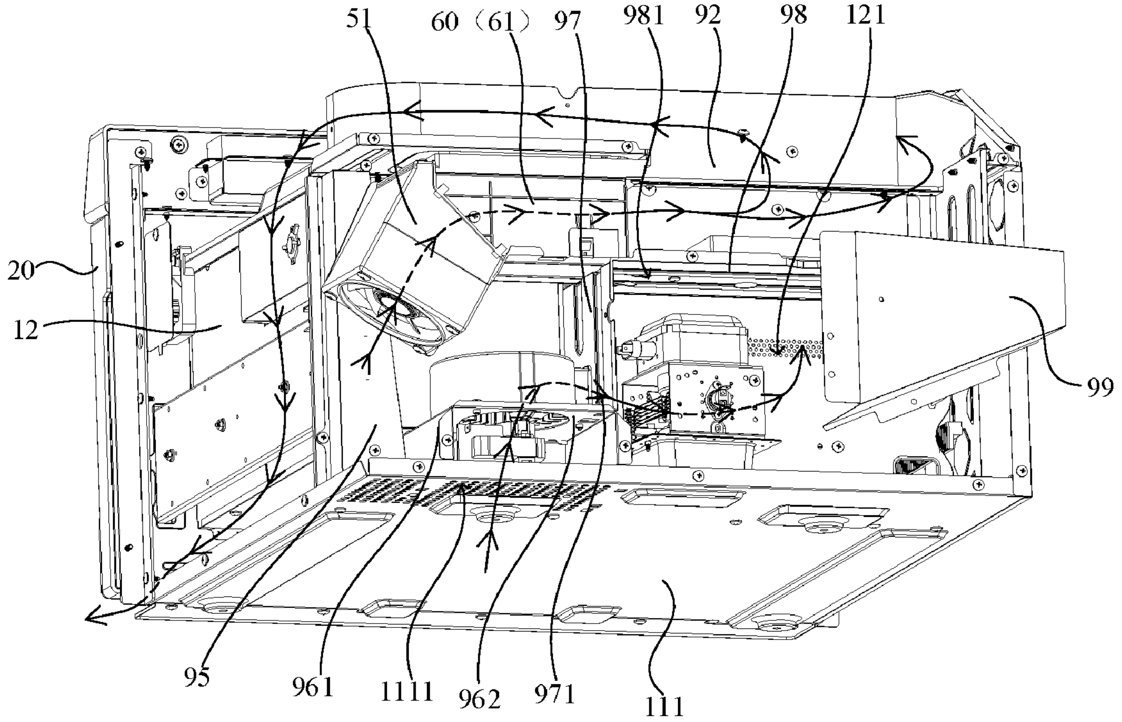
FIG. 12 is a schematic structural view of the embedded microwave oven in another perspective according to an embodiment of the present disclosure, with a rear cover plate and a first side cover plate removed.

Further, referring to FIGS. 10 to 12, the embedded microwave oven further includes a variable frequency power supply 60 and a magnetron 70. The top wall of the cooking cavity 12 is provided with a lateral surrounding edge 92 on a side thereof away from the door 20, wherein the lateral surrounding edge 92 is attached to the top cover plate 114. The radiator fan, the variable frequency power supply 60 and the magnetron 70 are all arranged in a spacing region between a rear wall of the cooking cavity 12 and the rear cover plate 113. In this way, the lateral surrounding edge 92 separates the hot air assembly 80 from the variable frequency power supply 60 and the magnetron 70, which can prevent the heat generated by the hot air assembly 80 from jumping to the variable frequency power supply 60 and the magnetron 70 behind the lateral surrounding edge 92, thereby affecting the normal operation of the variable frequency power supply 60 and the magnetron 70.

Further, referring to FIGS. 11 and 12, the radiator fan includes a first fan 51 for heat dissipation of the variable frequency power supply 60 and a second fan 52 for heat dissipation of the magnetron 70. The lateral surrounding edge 92 includes a main body surrounding edge 921 and an arc-shaped surrounding edge 922 connected to one end of the main body surrounding edge 921. The arc-shaped surrounding edge 922 is used to guide the air to the spacing region between the side wall of the cooking cavity 12 and the first side cover plate 112. The top wall of the cooking cavity 12 is also provided with a guiding edge 93, a ventilation gap 94 is provided between the guiding edge 93 and the other end of the main body surrounding edge 921, and the guiding edge 93 extends towards a middle part of the cooking cavity 12. In this way, the air blown by the first fan 51 dissipates heat for the variable frequency power supply 60, and the air blown by the second fan 52 dissipates heat for the magnetron 70, which has a better heat dissipation effect. In addition, a part of the air discharged by the radiator fan flows along the lateral surrounding edge 92 and enters the spacing region between the side wall of the cooking cavity 12 and the first side cover plate 112, and then exits from the front air exit holes 31 and the front air outlet 13 of the front plate 30; the other part of the air discharged by the radiator fan enters the top of the cooking cavity 12 via the ventilation gap 94, and then flows through the hot air assembly 80 and enters the spacing region between the side wall of the cooking cavity 12 and the first side cover plate 112, and is also discharged from the front air exit holes 31 and the front air outlet 13 of the front plate 30 in sequence.

Further, referring to FIGS. 9 to 12, the air inlet mesh includes a side air inlet mesh 1121 and a bottom air inlet mesh 1111. The first side cover plate 112 is provided with the side air inlet mesh 1121 on one of corner parts thereof close to the rear cover plate 113 and the bottom cover plate 111, the bottom cover plate 111 is provided with the bottom air inlet mesh 1111 on one of corner parts thereof close to the first side cover plate 112 and the rear cover plate 113. A plane where an air inlet of the first fan 51 is located is arranged obliquely with respect to the bottom cover plate 111 and to face the side air inlet mesh 1121 and the bottom air inlet mesh 1111, a plane where the air outlet of the first fan 51 is located is arranged to face the variable frequency power supply 60, a plan where an air inlet of the second fan 52 is located faces the bottom air inlet mesh 1111 or the side air inlet mesh 1121, and a plane where an air outlet of the second fan 52 is located is arranged to face the magnetron 70. In this way, on the one hand, the first fan 51 draws in the air outside the cooker body 10 through the side air inlet mesh 1121 and the bottom air inlet mesh 1111, and blows it to the variable frequency power supply 60 for heat dissipation. The large amount of air entering has a good heat dissipation effect on the variable frequency power supply 60, the second fan 52 draws in the air outside the cooker body 10 through the bottom air inlet mesh 1111 or the side air inlet mesh 1121, and blows it to the magnetron 70 for heat dissipation, which achieves a good heat dissipation effect of the magnetron 70; on the other hand, the occupation space of the first fan 51 in a horizontal direction can be reduced to a certain extent compared to a horizontal arrangement because a plane of the air inlet of the first fan 51 is arranged obliquely with respect to the bottom cover plate 111, which can increase the volume of the cooking cavity 12 while reducing the heat dissipation effect.

Specifically, in order to prevent hot air entering the spacing region between the side wall of the cooking cavity 12 and the first side cover plate 112 from being sucked into the radiator fan, a barrier 95 is provided in a position which is in the spacing region between the side wall of the cooking cavity 12 and the first side cover plate 112 and is close to the rear wall of the cooking cavity 12.

Further, referring to FIGS. 9 to 12, the rear cover plate 113 is provided with a first rear air inlet mesh 1131 at one of corner parts thereof close to the first side cover plate 112 and the bottom cover plate 111. In this way, when the first fan 51 and the second fan 52 work, the outside air of the cooker body 10 can also enter the cooker body 10 through the first rear air inlet mesh 1131 to increase the air intake quantity and ensure better heat dissipation effect.

Further, referring to FIGS. 9 to 12, the first fan 51 is arranged above the second fan 52, and an included angle between a first central axis 511 of the first fan 51 and a second central axis 521 of the second fan 52 is A, and A is less than 90°. It should be explained that the first central axis 511 of the first fan 51 refers to an axis line perpendicular to the plane where the air inlet of the first fan 51 is located, and the second central axis 521 of the second fan 52 refers to an axis line perpendicular to the plane where the air inlet of the second fan 52 is located. Specifically, the included angle A between the first central axis 511 of the first fan 51 and the second central axis 521 of the second fan 52 is 30° ~40°, preferably, A is 36°.

Further, the second fan 52 is a turbo fan, an upper surface and a lower surface of the turbo fan are both provided with air inlets, the lower surface of the turbo fan is connected to a first air guide cover 96, a top plate of the first air guide cover 96 is provided with a first vent in communication with an air inlet of the lower surface of the turbo fan, a motor of the turbo fan is arranged in the first air guide cover 96, the first air guide cover 96 covers one part of a region of the bottom air inlet mesh 1111, and a projection of the first fan 51 on the bottom cover plate 111 along a vertical direction is located on the other part of the region of the bottom air inlet mesh. In this way, the first air guide cover 96 can divide the air entering the first outer housing 11 from the bottom air inlet mesh 1111 into two independently isolated air, one of which is sucked in through the air inlet of the first fan 51, and the other of which is sucked in through the air inlet of the second fan 52, and the two air flow will not be chaotic and partially offset, which improves the utilization rate of cold air and ensures the heat dissipation effect; in addition, the fan motor 522 of the turbo fan is arranged in the first air guide cover 96, and the air flows entering the first air guide cover 96 has a heat dissipation effect on the fan motor 522, so that the service life of the fan motor 522 is prolonged.

Specifically, referring to FIGS. 9 to 12, the first air guide cover 96 includes two baffles 961 arranged at intervals and a mounting plate 962 connecting the two baffles 961. The first vent is formed on the mounting plate 962. The baffle 961 is connected to the rear wall of the cooking cavity 12 and the rear cover plate 113 respectively. The motor of the second fan 52 is arranged between the two baffles 961. The region between the two baffles 961 is opposite to the first rear air inlet mesh 1131 of the rear cover plate 113, and the outside air can enter between the two baffles 961 through the first rear air inlet mesh 1131. In addition, the mounting plate 962 is opposite to the bottom air inlet mesh 1111 of the bottom cover plate 111, and the outside air can also enter the first air guide cover 96 through the bottom air inlet mesh 1111.

Further, referring to FIGS. 9 to 12, a ventilation gap 53 is provided between the first fan 51 and the second fan 52. In this way, a part of the air enters the first air guide cover 96 through the bottom air inlet mesh 1111 and enters the air inlet on the lower surface of the second fan 52, and the other part enters the first outer housing 11 through the bottom air inlet mesh 1111 and the side air inlet mesh 1121, and then enters the air inlet on the upper surface of the second fan 52 from the ventilation gap 53 between the first fan 51 and the second fan 52, thereby increasing the cold air intake quantity of the second fan 52, so as to have a better heat dissipation effect.

Further, referring to FIGS. 9 to 12, a second outer housing 61 of the variable frequency power supply 60 is provided with a first lateral ventilation channel, and the air outlet of the first fan 51 is in communication with one end of the first lateral ventilation channel, an outer wall of the other end of the first lateral ventilation channel is connected to a vertical spacing plate 97 and a lateral spacing plate 98. The vertical spacing plate 97 and the lateral spacing plate 98 are arranged in periphery of the magnetron 70, the vertical spacing plate 97 is provided with a second vent 971, and the air outlet of the second fan 52 is in communication with the second vent 971. In this way, on the one hand, the cold air sent from the air outlet of the first fan 51 enters the first lateral ventilation channel to achieve better heat dissipation of the variable frequency power supply 60; on the other hand, under the action of the vertical spacing plate 97 and the lateral spacing plate 98, the two air flows will not be chaotic and partially offset, which improves the utilization rate of the cold air and ensures the heat dissipation effect.

Further, the lateral spacing plate 98 is connected to the rear wall of the cooking cavity 12 and the rear cover plate 113 respectively. Similarly, the vertical spacing plate 97 is connected to the rear wall of the cooking cavity 12 and the rear cover plate 113 respectively.

Further, referring to FIGS. 9 to 12, a power connector 71 of the magnetron 70 is provided adjacent to the lateral spacing plate 98. The lateral spacing plate 98 is provided with a third vent 981 corresponding to the power connector of the magnetron 70, and the third vent 981 is located on a side of the lateral spacing plate 98 close to the vertical spacing plate 97. In this way, after the cold air of the first fan 51 flows out through the first lateral ventilation channel, a part of the air flows into the space region where the magnetron 70 is located through the third vent 981, and flows into the region where the magnetron 70 is located from top to bottom, so as to be in full heat exchange contact with the magnetron 70, which can better reduce the temperature of the magnetron 70. In addition, it is possible to avoid whirling air in the region where the magnetron 70 is located.

Further, referring to FIGS. 9 to 12, the embedded microwave oven further includes a second air guide cover 99. The radiator shell 72 of the magnetron 70 is provided with a second lateral ventilation channel, the rear wall of the cooking cavity 12 is provided with a second rear air inlet mesh 121, and the second air guide cover 99 covers the second rear air inlet mesh 121, the second vent 971, the second lateral ventilation channel, and an air inlet of the second air guide cover 99 are in communication in sequence. In this way, the cold air from the second fan 52 enters the second air guide cover 99 through the second vent 971 and the second lateral ventilation channel, and then enters the cooking cavity 12 through the second rear air inlet mesh 121.

Further, referring to FIGS. 9 to 12, the air inlet of the second air guide cover 99 is provided with a heat conducting edge 991, and the heat conducting edge 991 is attached to the magnetron 70. Specifically, the heat conducting edge 991 is attached to the radiator shell 72 of the magnetron 70, and the heat of the radiator shell 72 of the magnetron 70 is conducted to the second air guide cover 99 according to the heat conduction principle, which improves the heat dissipation effect of the magnetron 70.

In a specific embodiment, referring to FIGS. 9 to 12, a power connector 71 of the magnetron 70 is arranged close to the lateral spacing plate 98, the lateral spacing plate 98 is provided with a third vent 981 corresponding to the power connector of the magnetron 70, and the third vent 981 is located on a side of the lateral spacing plate 98 close to the vertical spacing plate 97. The embedded microwave oven further includes a second air guide cover 99, the radiator shell 72 of the magnetron 70 is provided with a second lateral ventilation channel, the rear wall of the cooking cavity 12 is provided with a second rear air inlet mesh 121, the second air guide cover 99 covers the second rear air inlet mesh 121, the second vent 971, the second lateral ventilation channel, and the air inlet of the second air guide cover 99 are in communication in sequence. In this way, when only the air blown by the second fan 52 is contained in the second air guide cover 99, whirling air is easily generated in the second air guide cover 99, and after the third vent 981 is provided on the lateral spacing plate 98, the air blown by the first fan 51 can enter the region where the magnetron 70 is located from top to bottom through the third vent 981, and enters the second air guide cover 99, which helps to avoid the generation of whirling air and at the same time to have a better heat dissipation effect on the magnetron 70.

Further, the drawer-type microwave oven further includes a container connected to the door 20 for placing cooking objects, and the door 20 is connected to the side wall of the cooking cavity 12 via a slide rail.

Further, referring to FIGS. 9 to 12, the first outer housing 11 further includes a second side cover plate 115. The second side cover plate 115 is arranged opposite to the first side cover plate 112, and the second side cover plate 115 is connected to the rear cover plate 113 and the bottom cover plate 111, respectively. The three side edges of the top cover plate 114 are connected to the first side cover plate 112, the rear cover plate 113 and the second side cover plate 115, respectively.

The technical features of the embodiments described above may be arbitrarily combined. For the sake of brevity of description, not all possible combinations of the technical features in the aforementioned embodiments are described. However, as long as there is no contradiction between the combinations of these technical features, all should be considered as the scope of this specification.

The aforementioned examples only express several implementation of the present disclosure, and the descriptions thereof are more specific and detailed, but they cannot be understood as a limitation on the scope of the present disclosure. It should be noted that, for those who skilled in the art, a plurality of modifications and improvements can be made without departing from the concept of the present disclosure, which all belong to the protection scope of the present disclosure. Therefore, the protection scope of the present disclosure shall be subject to the appended claims.

As used herein, the term "coupled" can mean any physical, electrical, magnetic, or other connection, either direct or indirect, between two parties. The term "coupled" is not limited to a fixed direct coupling between two entities.

The invention claimed is:

1. An embedded microwave oven, comprising:

a cooker body and a door, wherein the cooker body includes a housing and a cooking cavity provided in the housing, both the housing and the cooker body are provided with an opening corresponding to the door, the door is openably covered the opening, the housing includes a bottom cover plate, a first side cover plate and a rear cover plate, the first side cover plate and the rear cover plate are all connected to the bottom cover plate, and at least one of the bottom cover plate, the first side cover plate and the rear cover plate is provided with an air inlet mesh;

a front plate arranged in periphery of the opening of the cooking cavity, wherein a bottom of the front plate is provided with a front air exit hole penetrating the front plate, a spacing region is formed between a housing wall of the housing and a cavity wall of the cooking cavity, the front air exit hole is in communication with the spacing region, and when the door is closed, the door is attached to the front plate to seal the opening;

a first spacing plate connected to a bottom edge of the front plate or to a side edge of the bottom cover plate adjacent to the opening, wherein the first spacing plate is located below the door and a front air outlet is formed between the first spacing plate and a bottom end of the door, a supporting leg protruding downward is provided on a bottom surface of the bottom cover plate, and a supporting surface where the first spacing plate and the supporting leg are placed is provided with a front air inlet; and a radiator fan arranged in the spacing region between the housing wall of the housing and the cavity wall of the cooking cavity.

2. The embedded microwave oven according to claim 1, wherein a bottom part of the door facing a plate surface of the front plate is provided with a bottom edge notch, and the bottom edge notch and the front air exit hole are arranged oppositely.

3. The embedded microwave oven according to claim 2, wherein two side parts of the door facing the plate surface of the front plate are both provided with a side edge notch, and two side edge notches are in communication with both ends of the bottom edge notch, respectively.

4. The embedded microwave oven according to claim 1, wherein the housing further comprises a top cover plate arranged on the top of the cooking cavity, the top cover plate is connected to the first side cover plate and the rear cover plate, respectively; a top wall of the cooking cavity is provided with a hot air assembly, the top cover plate covers the hot air assembly, and at least a part of the air discharged by the radiator fan flows through the hot air assembly.

5. The embedded microwave oven according to claim 4, further comprising a variable frequency power supply and a magnetron, wherein the top wall of the cooking cavity is provided with a lateral surrounding edge on a side thereof away from the door, the lateral surrounding edge is attached to the top cover plate, and the radiator fan, the variable frequency power supply and the magnetron are all arranged in a spacing region between a rear wall of the cooking cavity and the rear cover plate.

6. The embedded microwave oven according to claim 5, wherein the radiator fan comprises a first fan for heat dissipation of the variable frequency power supply and a second fan for heat dissipation of the magnetron; the lateral surrounding edge comprises a main body surrounding edge and an arc-shaped surrounding edge connected to one end of the main body surrounding edge, the arc-shaped surrounding edge is used to guide the air to a spacing region between a side wall of the cooking cavity and the first side cover plate; the top wall of the cooking cavity is also provided with a guiding edge, a ventilation gap is provided between the guiding edge and the other end of the main body surrounding edge, and the guiding edge extends to a middle part of the cooking cavity.

7. The embedded microwave oven according to claim 6, wherein the air inlet mesh comprises a side air inlet mesh and a bottom air inlet mesh; the first side cover plate is provided with the side air inlet mesh on one of corner parts thereof adjacent to the rear cover plate and the bottom cover plate, the bottom cover plate is provided with the bottom air inlet mesh on one of corner parts thereof adjacent to the first side cover plate and the rear cover plate;

a plane where an air inlet of the first fan is located is arranged obliquely with respect to the bottom cover plate and to face the side air inlet mesh and the bottom air inlet mesh, a plane where an air outlet of the first fan is located is arranged to face the variable frequency power supply, a plane where an air inlet of the second fan is located faces the bottom air inlet mesh or the side air inlet mesh, and a plane where an air outlet of the second fan is located is arranged to face the magnetron.

8. The embedded microwave oven according to claim 7, wherein the rear cover plate is provided with a first rear air inlet mesh at one of corner parts thereof adjacent to the first side cover plate and the bottom cover plate.

9. The embedded microwave oven according to claim 7, wherein the first fan is arranged above the second fan, an included angle between a first central axis of the first fan and a second central axis of the second fan is A, and A is less than 90°.

10. The embedded microwave oven according to claim 9, wherein the second fan is a turbo fan, an upper surface and a lower surface of the turbo fan are both provided with an air inlet, the lower surface of the turbo fan is connected to a first air guide cover, a top plate of the first air guide cover is provided with a first vent in communication with the air inlet of the lower surface of the turbo fan, a motor of the turbo fan is arranged in the first air guide cover which covers one part of a region of the bottom air inlet mesh, and a projection of the first fan on the bottom cover plate along a vertical direction is located on the other part of the region of the bottom air inlet mesh.

11. The embedded microwave oven according to claim 10, wherein a ventilation gap is provided between the first fan and the second fan.

12. The embedded microwave oven according to claim 10, wherein a second outer housing of the variable frequency power supply is provided with a first lateral ventilation channel, the air outlet of the first fan is in communication with one end of the first lateral ventilation channel, an outer wall of the other end of the first lateral ventilation channel is connected to a vertical spacing plate and a lateral spacing plate, the vertical spacing plate and the lateral spacing plate are arranged in periphery of the magnetron, a second vent is provided on the vertical spacing plate, and the air outlet of the second fan is in communication with the second vent.

13. The embedded microwave oven according to claim 12, wherein a power connector of the magnetron is arranged adjacent to the lateral spacing plate; the lateral spacing plate is provided with a third vent corresponding to the power connector of the magnetron, and the third vent is located on a side of the lateral spacing plate adjacent to the vertical spacing plate.

14. The embedded microwave oven according to claim 12, further comprising a second air guide cover, wherein a radiator shell of the magnetron is provided with a second lateral ventilation channel, a rear wall of the cooking cavity is provided with a second rear air inlet mesh, the second air guide cover covers the second rear air inlet mesh, the second vent, the second lateral ventilation channel, and an air inlet of the second air guide cover are in communication in sequence.

15. The embedded microwave oven according to claim 14, wherein the air inlet of the second air guide cover is provided with a heat conducting edge, and the heat conducting edge is attached to the magnetron.

16. The embedded microwave oven according to claim 1, further comprising a container for placing cooking objects connected to the door, the door being connected to the side wall of the cooking cavity via a slide rail.

* * * * *